United States Patent [19]

Williams

[11] Patent Number: 5,415,236

[45] Date of Patent: May 16, 1995

[54] SUBSOILER HAVING REARWARDLY DISPOSED SOIL FRACTURING STRUCTURE

[75] Inventor: Robert A. Williams, Garden City, Kans.

[73] Assignee: Acra-Plant, Inc., Garden City, Kans.

[21] Appl. No.: 213,461

[22] Filed: Mar. 14, 1994

Related U.S. Application Data

[63] Continuation of Ser. No. 853,804, Mar. 19, 1992, abandoned.

[51] Int. Cl.$^6$ .............................................. A01B 13/08
[52] U.S. Cl. ..................... 172/699; 172/730; 172/753; 172/770; 172/772; 37/446
[58] Field of Search .................. 37/446, 452; 172/699, 172/750, 713, 721, 730, 753, 765, 769, 770, 772, 772.5

[56] References Cited

U.S. PATENT DOCUMENTS

| | | | |
|---|---|---|---|
| 3,085,635 | 4/1963 | Livermore | 172/699 |
| 3,171,500 | 3/1965 | Dils, Jr. | 172/700 |
| 3,298,012 | 8/1966 | Ratkowski | 172/700 |
| 3,839,806 | 10/1974 | Hood et al. | 37/142 R |
| 3,842,077 | 7/1978 | Morrison | 172/699 |
| 4,773,340 | 9/1988 | Williams et al. | 172/699 |
| 4,924,946 | 5/1990 | Dietrich, Jr. | 172/699 |
| 4,932,478 | 6/1990 | Jones | 172/699 |

FOREIGN PATENT DOCUMENTS 292073  7/1965  Netherlands ............ 172/699

Primary Examiner—Randolph A. Reese
Assistant Examiner—Spencer Warnick
Attorney, Agent, or Firm—Hovey, Williams, Timmons & Collins

[57] ABSTRACT

The subsoiler has shank assemblies which are designed to cut a thin, clean slice in the soil without frontal upheaval forces that would cause eruption of the soil in a turbulent manner ahead of the shank line. The soil lifting components at the bottom of the shank are configured to produce generally laminar soil flow over and around their lifting surfaces so that the upwardly and outwardly directed fracturing forces occur behind the leading shank line in a readily controllable manner and without disturbing residue and other materials on top of the ground. The subsoiling profile at the bottom of the shank may be varied by interchanging variously configured points and caps which are securely but removably secured to the shank. An alternate embodiment provides adjustment of the profile presented to the soil by having a portion of the component angularly vertically adjustable to vary the angle of attack of its lifting surfaces.

24 Claims, 11 Drawing Sheets

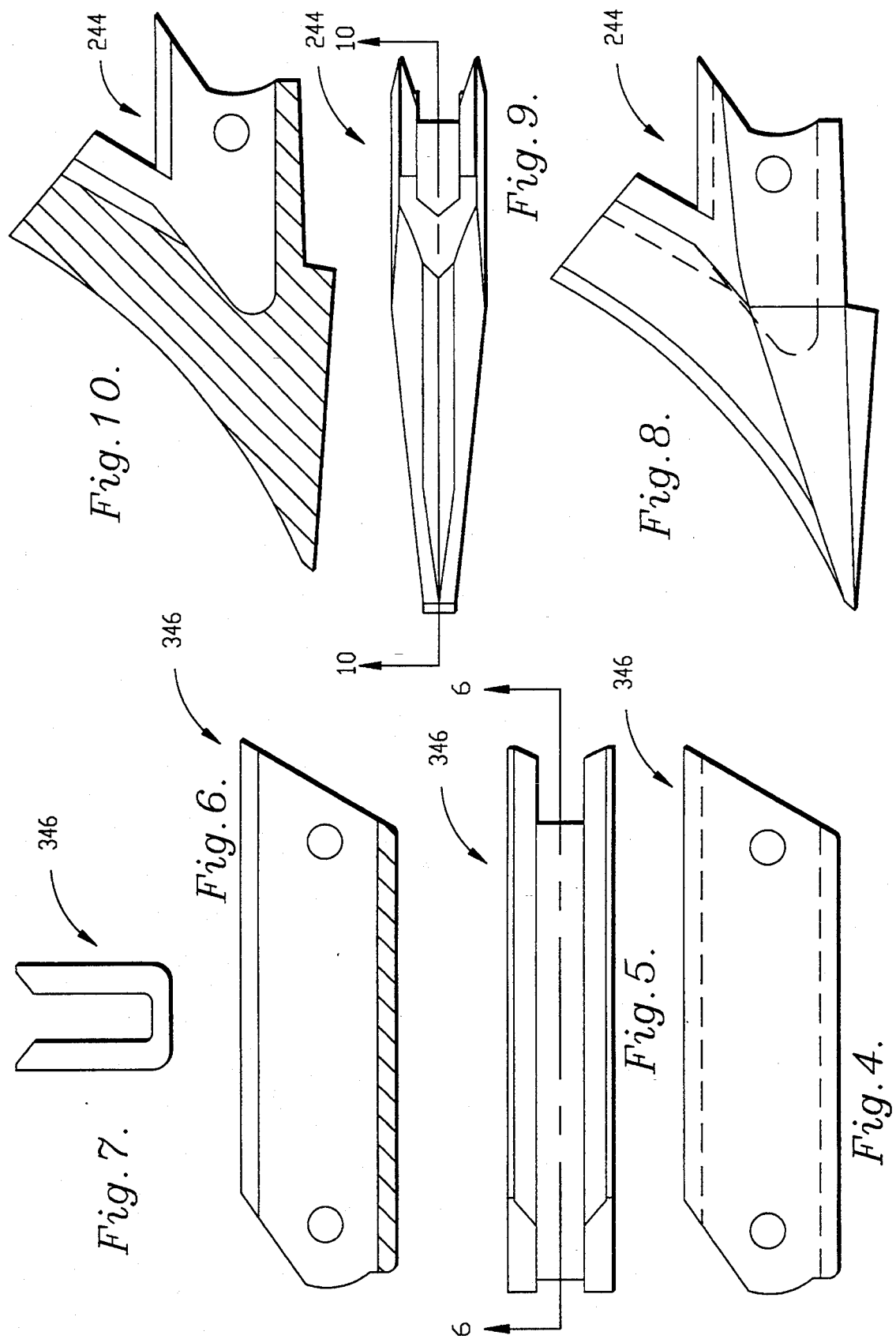

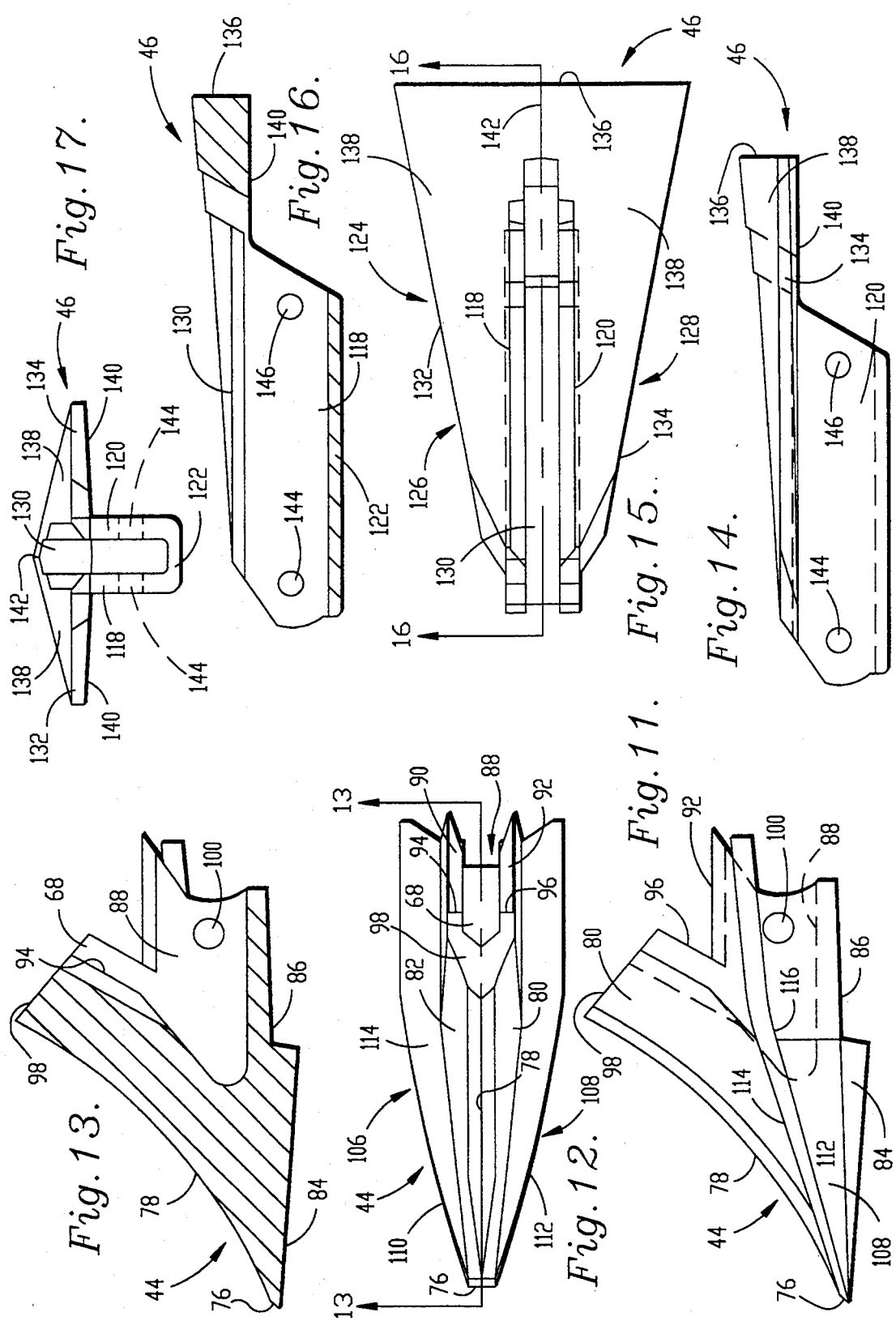

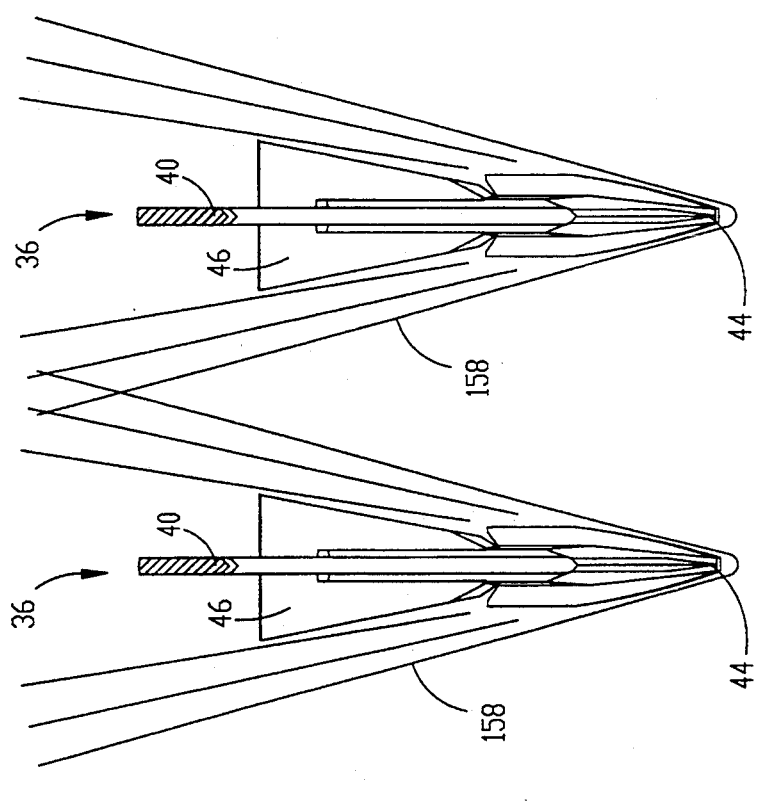
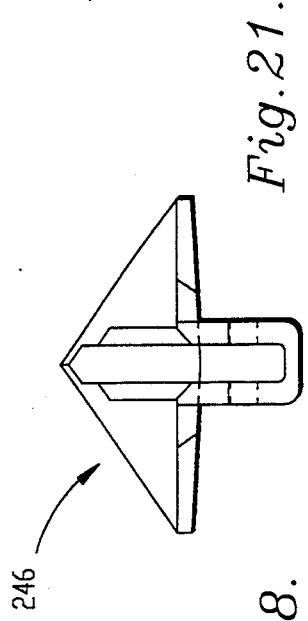
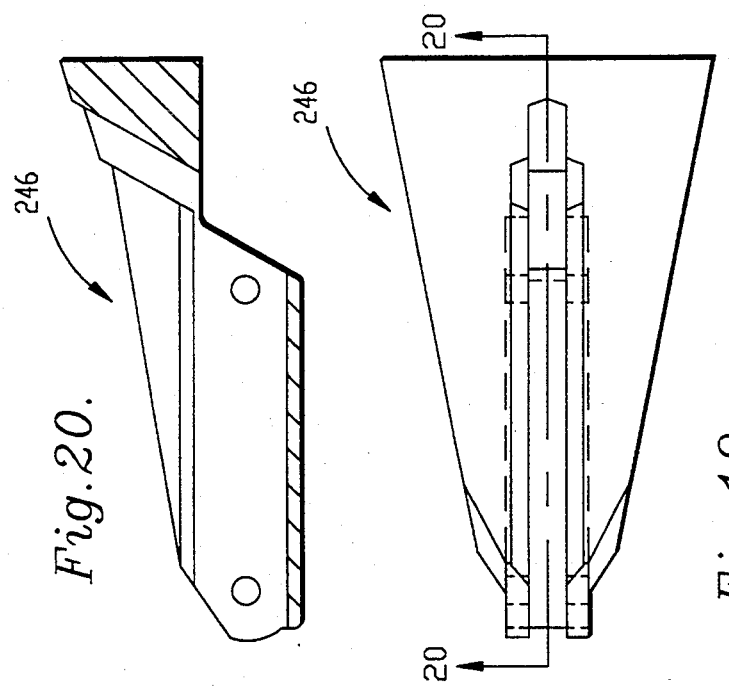
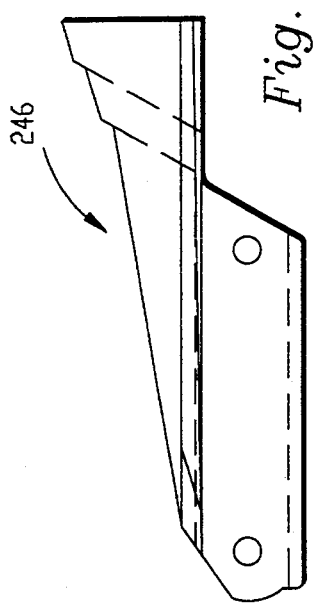

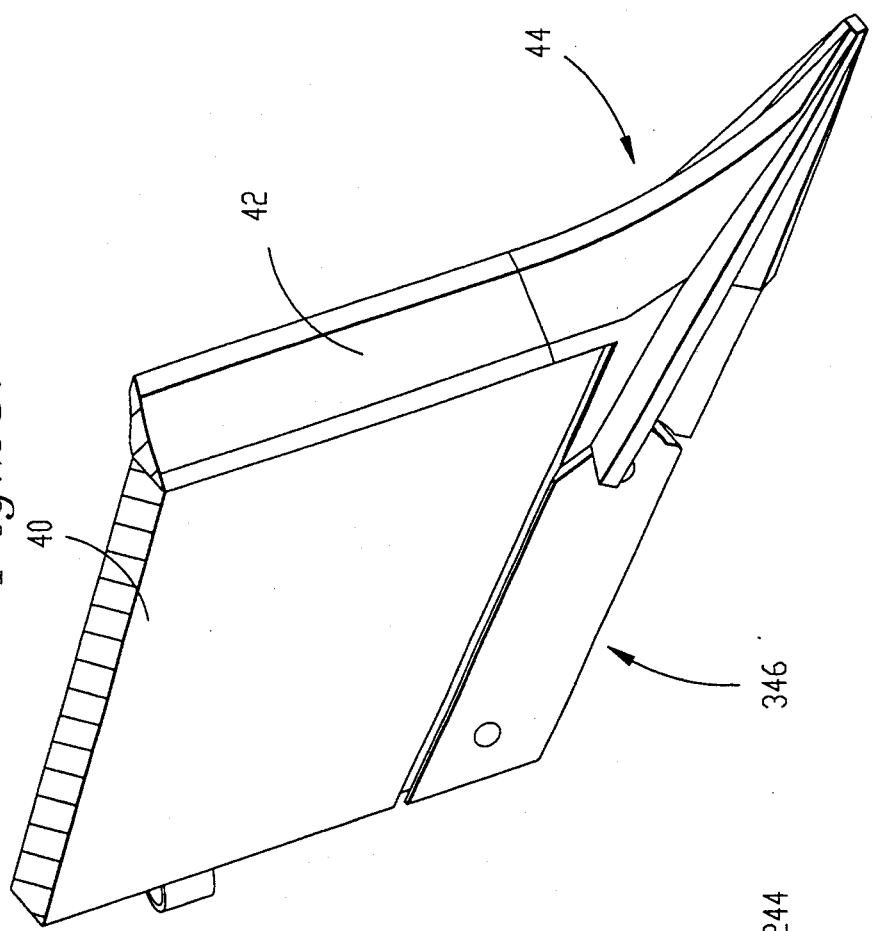
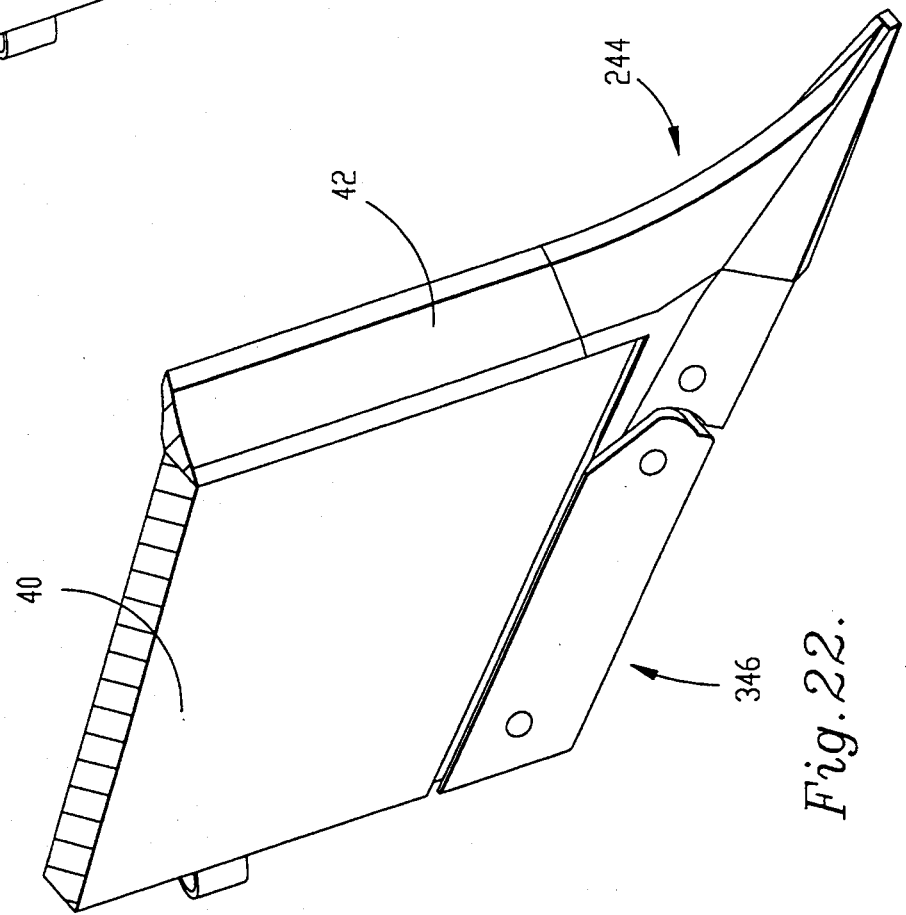

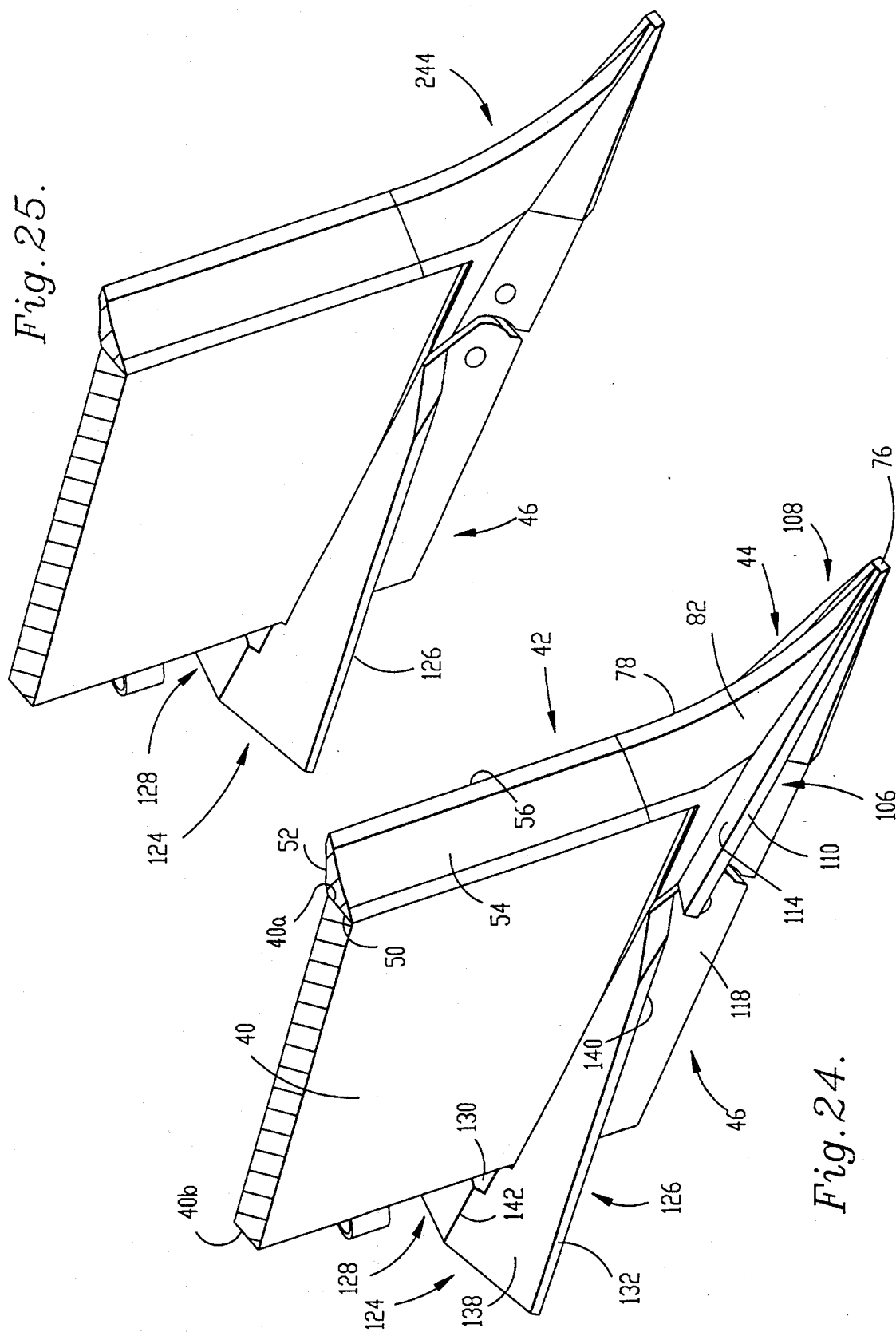

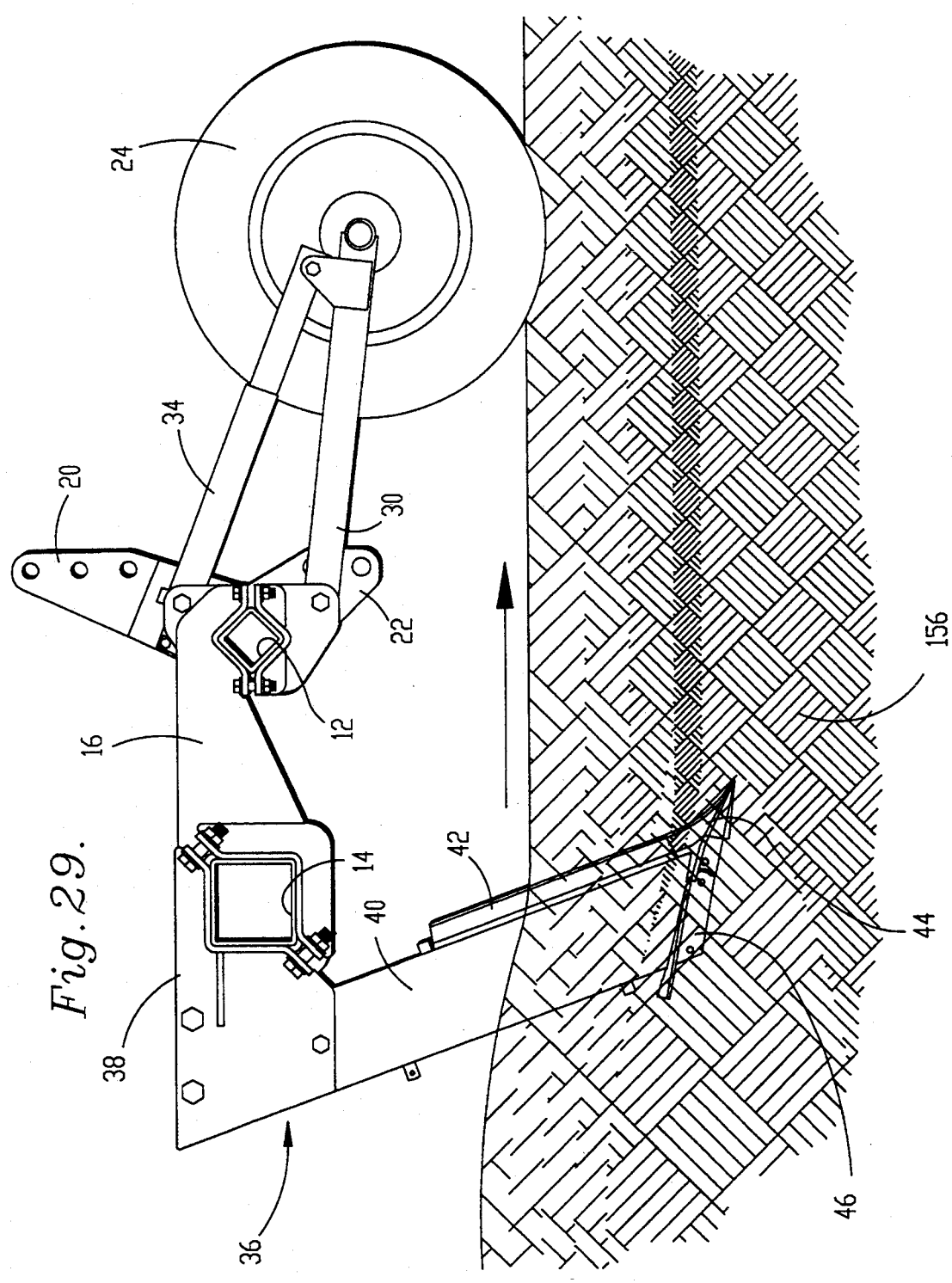

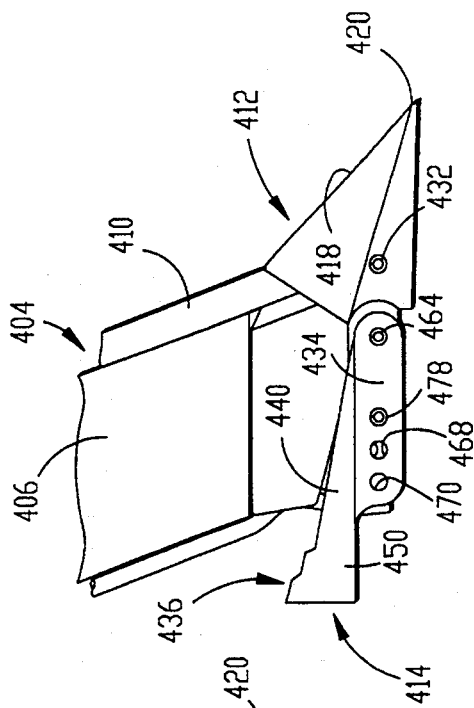
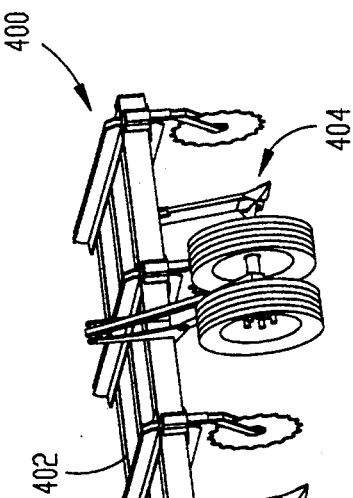
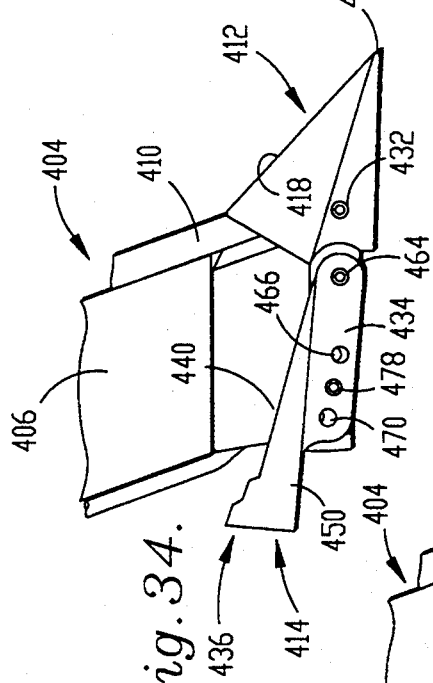
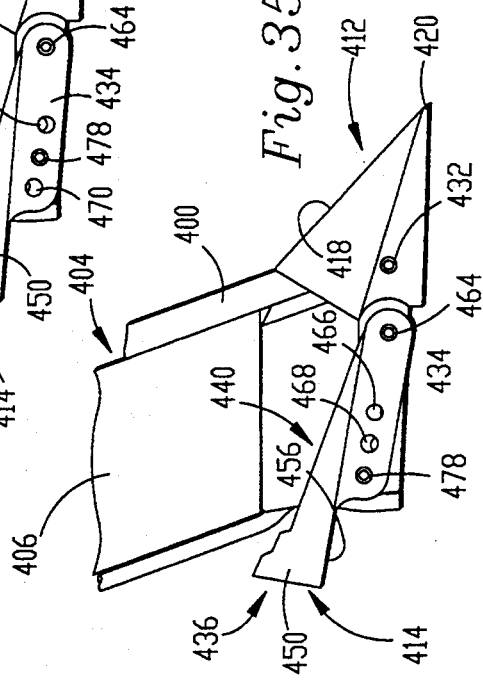

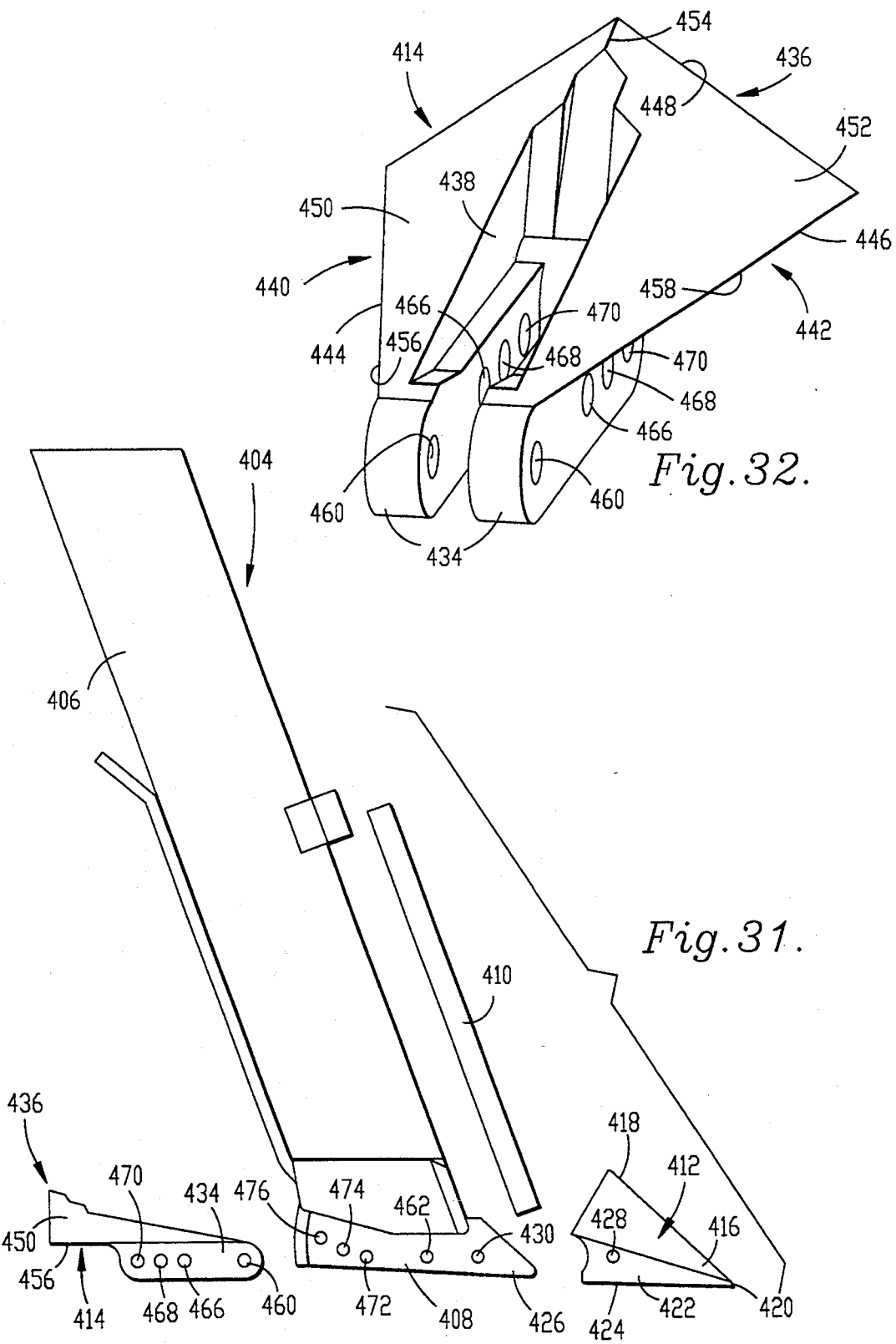

SUBSOILER HAVING REARWARDLY DISPOSED SOIL FRACTURING STRUCTURE

This is a continuation of application Ser. No. 07/853,804, filed Mar. 19, 1992, now abandoned.

TECHNICAL FIELD

This invention relates to subsoil tillage and, more particularly, to a subsoiler which is designed to provide the desired degree of subsurface soil fracturing with only minimal disturbance of trash and residue on top of the ground.

BACKGROUND

Many conventional subsoilers, such as those employing parabolic shanks with broad flat points at their lower ends, tend to create massive frontal shock waves ahead of the shanks as the subsoilers move through the soil. This results in a turbulent soil flow up and around the shank as it moves forwardly so that the soil boils up ahead of the shank and produces heavy slabs and clods on the ground surface, as well as a relatively wide trench with scattered and turned under surface residue. Thus, moisture in the upturned clods evaporates more quickly and the valuable top soil is exposed to wind and water erosion. Furthermore, incorporation of the turned under surface residue into the soil can have significant negative effects on water movement in the soil.

It is believed that the plow-like effects of conventional subsoilers and agressive residue incorporation destroy a natural layering of the soil environment and create a disruption of natural microbial interactions and processes. These natural microbial interactions occur within varying soil levels at varying depths. A natural system leaves the residue on top of the soil such that the natural aerobic microbes and insects can freely interact with free atmospheric oxygen to decompose the plant fibers and leach their nutrients through natural processes back into the soil. Thus, buried residue disrupts the natural, healthy plant environment.

SUMMARY OF THE INVENTION

Accordingly, one important object of the present invention is to provide a subsoiler which performs its soil fracturing and loosening action almost exclusively below ground level while leaving the top surface of the soil generally undisturbed, except for a narrow slit in the soil. Another important object is to provide a subsoiler that retains the natural and existing layering of the soil environment while leaving surface residue largely unincorporated into the soil to promote the natural decomposition of the plant fibers and natural microbial interaction within the varying soil levels.

Pursuant to these objectives, the present invention contemplates having the subsoiler slice cleanly through the soil along its leading edge while exerting the desired degree of lifting force at a point behind such leading edge of the device so that the soil tends to flow around the subsoiler in a more laminar, controlled movement instead of the turbulent, unpredictable flow experienced in conventional devices which produce heavy frontal shock waves. Once the soil flow is smoothly around the relatively thin shank of the subsoiler to a point behind the front slicing edge, the soil can be subjected to such upward and more laterally outward forces as may be desired to fracture the soil layers below the top surface of the ground without causing an eruption through the top surface.

A further important object in this respect is to provide a subsoiler which permits the farmer to quickly and easily change the profile presented to the subsoil by structure at the lower end of the subsoiling shank so that the farmer can select the subsoil flow pattern necessary or desirable for the particular field conditions at hand. In this respect, the present invention contemplates the provision of a variety of selectively interchangeable points and caps for the lower end of the subsoiler shank in accordance with the particular field conditions at hand and the personal preferences of the user. In one form of the invention, the subsoiler may be especially suited for inter-row ripping in which very little outwardly directed side fracturing forces are exerted by the tillage component so that little more than a narrow slit is produced. This is accomplished by selecting a narrow, wingless point in conjunction with a trailing wingless cap around the bottom of the shank to facilitate soil penetration without extensive disruption or disturbance in a lateral sense. Increasing amounts of lateral and vertical lifting beneath the top surface of the soil can be achieved by selecting various combinations of winged points and unwinged trailing caps, or wingless points and winged trailing caps, depending upon the effect desired.

BRIEF DESCRIPTION OF THE DRAWINGS

FIG. 4 is an enlarged, left side elevational view of one embodiment of a wingless cap component which fits onto the foot piece of the shank of the subsoiler in accordance with the principles of the present invention;

FIG. 5 is a top plan view of the cap of FIG. 4;

FIG. 6 is a longitudinal cross-sectional view through the cap of FIG. 5 taken substantially along lines 6—6 thereof;

FIG. 7 is a rear end elevational view thereof;

FIG. 8 is a left, side elevational view of one embodiment of the point component of the present invention showing the wingless point version for minimum soil disturbance;

FIG. 9 is a top plan view of the wingless point of FIG. 8;

FIG. 10 is a longitudinal, cross-sectional view through the wingless point of FIG. 9 taken substantially along line 10—10 thereof;

FIG. 11 is a side elevational view of a second embodiment of the point component of the present invention illustrating the version having soil-disturbing vanes thereon;

FIG. 12 is a top plan view of the FIG. 11 point;

FIG. 13 is a longitudinal cross-sectional view of the vaned point taken substantially along line 13—13 of FIG. 12;

FIG. 14 is a second embodiment of a trailing cap for the lower end of the shank illustrating a delta-shaped winged version thereof for moderate soil disturbance;

FIG. 15 is a top plan view of the winged cap of FIG. 14;

FIG. 16 is a longitudinal cross-sectional view of the winged cap taken substantially along line 16—16 of FIG. 15;

FIG. 17 is a front end elevational view of the winged cap of FIGS. 14-16;

FIG. 18 is a third embodiment of a replaceable cap for the bottom of the shank illustrating a winged version similar to the cap of FIGS. 14-17, but with more steeply outwardly angled wing surfaces for even greater soil disturbance;

FIG. 19 is a top plan view of the FIG. 18 winged cap;

FIG. 20 is a longitudinal cross-sectional view through the winged cap of FIG. 19 taken substantially along line 20—20 thereof;

FIG. 21 is a front end view of the steeply winged cap of FIGS. 18-20;

FIG. 22 is a right front perspective view of a subsoiler shank adapted for minimum soil disturbance such as useful in inter-row ripping operations, utilizing the vaneless point of FIGS. 8-10 and the wingless cap of FIGS. 4-7;

FIG. 23 is a right front perspective view of a shank set up for slightly more aggressive subsoiling action than the FIG. 22 arrangement, utilizing the vaned point of FIGS. 11-13 in combination with the wingless cap of FIGS. 4-7;

FIG. 24 is a right front perspective view of the shank arranged for fairly aggressive tillage action using the vaned point of FIGS. 11-13 and the moderately winged cap of FIGS. 14-17;

FIG. 25 is a right front perspective view of the shank set up similarly to the FIG. 24 arrangement, but using the vaneless point of FIGS. 8-10 in combination with the moderately winged cap of FIGS. 14-17;

FIG. 28 is a top plan illustration of the three-dimensional shock wave cone believed to be produced by subsoilers in accordance with the present invention as they move through the soil;

FIG. 29 is a side elevational view of the implement using the setup corresponding to FIG. 24 and illustrating the laminar soil flow pattern and three-dimensional shock wave cone which are produced as the subsoiler moves through the soil;

FIG. 30 is a right front perspective view of an alternate embodiment utilizing somewhat differently configured point and cap components from those illustrated in FIGS. 1-29;

FIG. 31 is a side elevational exploded view of one of the alternate shanks and its replaceable soil working components;

FIG. 32 is an enlarged, left front perspective view of the winged cap component of the FIG. 30 embodiment which is adapted for angle adjustment to vary the profile presented to the soil as the tool moves therethrough;

FIG. 33 is a fragmentary side elevational view of the FIG. 30 embodiment illustrating the winged cap component in its lowermost adjusted position for minimum soil disturbance;

FIG. 34 is a fragmentary right side elevational view of the FIG. 30 embodiment showing the winged cap in its intermediate upwardly adjusted position for intermediate tillage action; and FIG. 35 is a fragmentary right side elevational view of the FIG. 30 embodiment illustrating the winged cap adjusted to its most steeply inclined, uppermost position for maximum soil disturbance.

DETAILED DESCRIPTION

Figure 1:
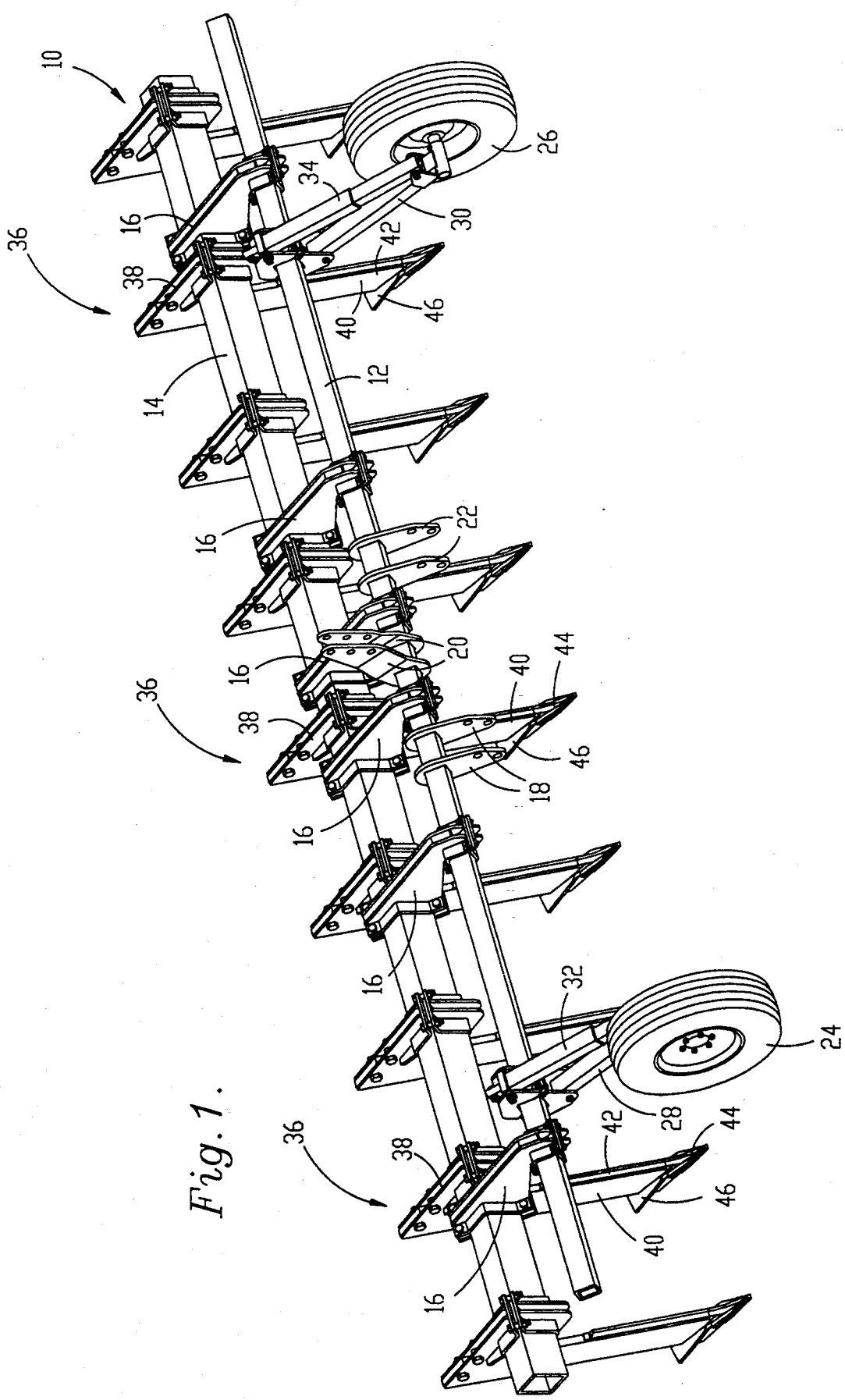
FIG. 1 is a right front perspective view of a subsoiler implement constructed in accordance with the principles of the present invention.

Figure 1 illustrates a subsoiler implement 10 which incorporates the principles of the present invention, although it will be understood that the particular implement with which the concepts of the present invention are utilized can take a variety of forms, the form illustrated herein being by way of example only.

The implement chosen for illustration has a mounting platform for the tillage shanks which takes the form of a pair of long, transversely square, tubular beams 12 and 14 which are rigidly interconnected in fore-and-aft, spaced, parallel relationship to one another by a series of tie brackets 16 clamped at their rear ends to the rear beam 14 and at their front ends to the front beam 12. The smaller front beam 12 has 3-point hitch members 18, 20, and 22 fixed thereto to adapt the implement 10 for connection with the corresponding 3-point coupling on a tractor (not shown). A pair of depth-gauging ground wheels 24 and 26 are also provided on the front beam 12 adjacent opposite ends thereof for regulating the working depth of the implement 10 as it is pulled across the field, the wheels 24 and 26 being swingably secured to the beam 12 by respective wheel arms 28,30 which can be adjustably raised and lowered via telescopically adjustable height control bars 32 and 34 which span between the beam 12 and the outer ends of the respective wheel arms 28,30. If desired, the implement 10 may be provided with a series of trash cutting coulters or the like (not shown) which would be attached to the beam 12 at spaced intervals along the latter in direct frontal alignment with the trailing shank assemblies yet-to-be described.

The rear beam 14 is provided with a series of subsoiling shank assemblies 36 at spaced intervals along its length. Each of the assemblies 36 includes an uppermost, generally fore-and-aft extending mounting bracket 38 that is clamped at its forward end to the beam 14 and projects freely in cantilevered manner from the beam 14 at its rear end where the bracket 38 is bolted to the upper end of a generally upright, although slightly downwardly and forwardly inclined shank 40. Each of the shanks 40 has three major soil working components associated with it which will be discussed in more detail below. In general, these comprise a long, generally upright, hardened, replaceable shin guard 42 along the front of the shank 40, a hardened replaceable point 44 at the lower front extremity of the shank 40, and a hardened, replaceable cap 46 situated along the bottom of the shank 40 in trailing relationship to the point 44.

Each of the shanks 40 is of heavy, plate-like construction, preferably being made from 1-¼ inch by 8 inch high carbon steel material. Thus, as illustrated perhaps best in FIG. 24, each of the shanks 40 presents a leading, relatively narrow flat edge 40a and a parallel trailing flat edge 40b. The shin guard 42 butts up against and protectively covers the front edge 40a, while the rear edge 40b may serve as a convenient mounting place for a vertically extending fertilizer deposit tube 48 as illustrated generally in FIG. 3.

Figure 3:
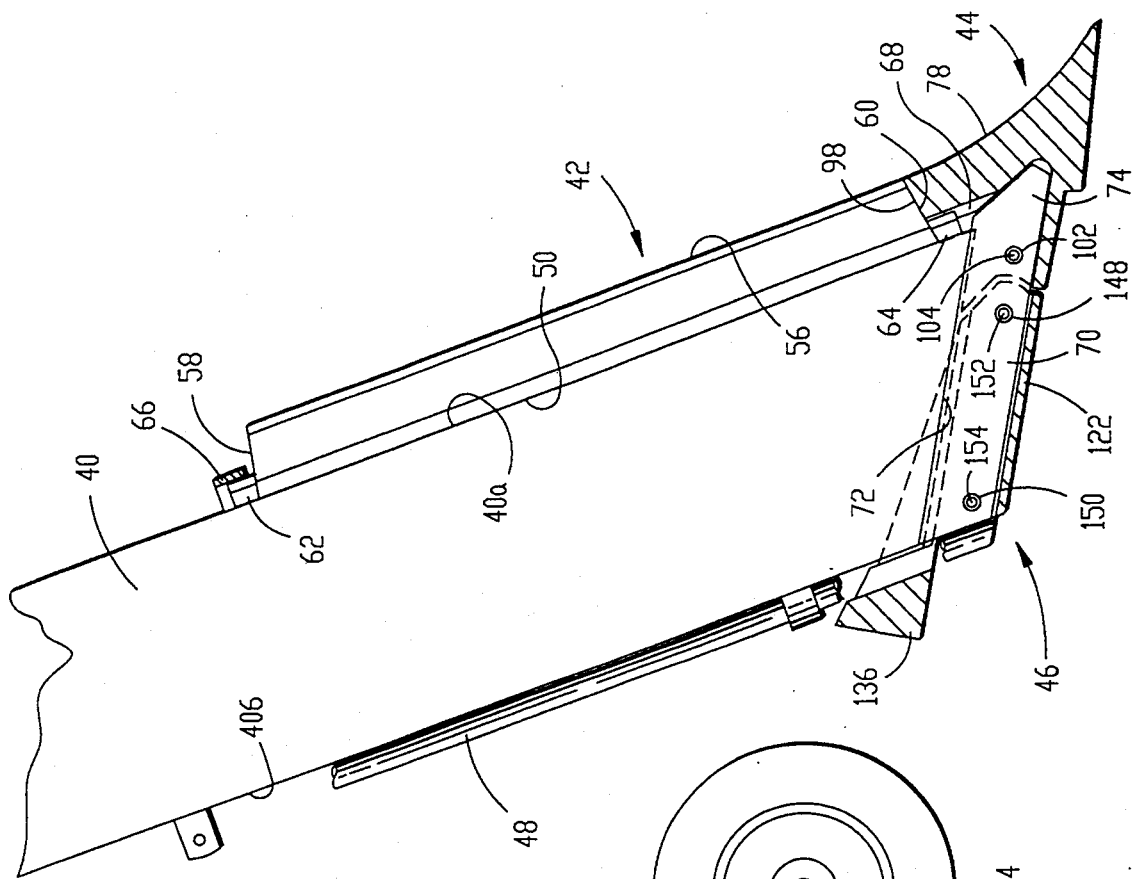
FIG. 3 is an enlarged, fragmentary, cross-sectional view of the lower end of one of the shanks of the implement illustrating details of construction of one embodiment of the invention.
Figure 2:
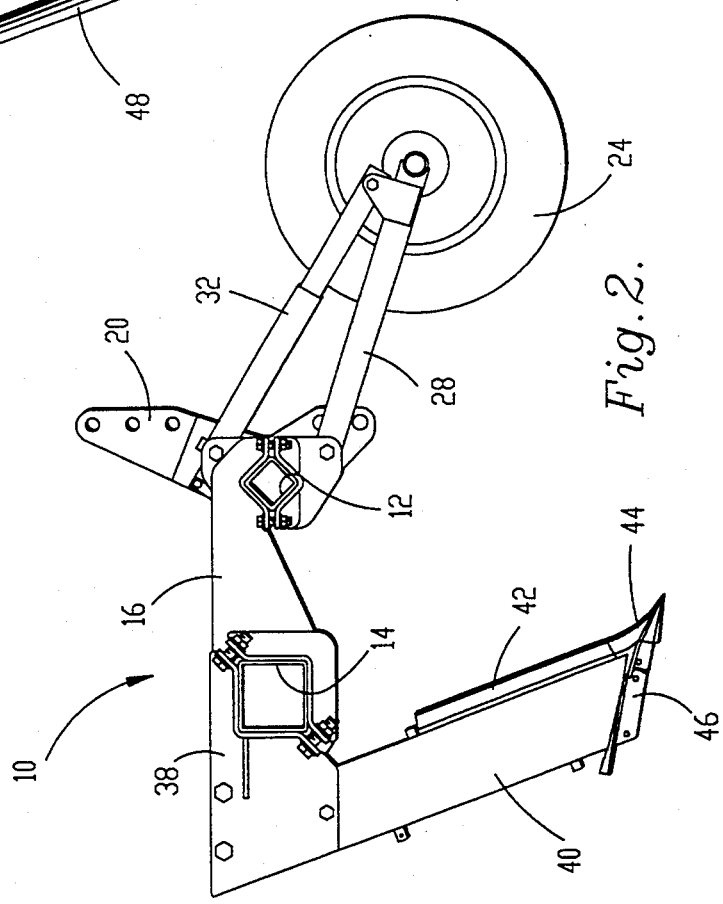
FIG. 2 is a right side elevational view thereof.

The shin guard 42 comprises an elongated bar of abrasion-resistant cast iron material having a generally triangular cross-sectional configuration so as to present a flat base 50 (FIG. 24) which butts up against the front edge 40a of shank 40, a pair of forwardly converging flat sides 52 and 54, and a sharp leading edge 56 defined by the convergence of the two sides 52,54. As illustrated in FIG. 3, the opposite upper and lower ends 58 and 60 of the shin guard 42 are flat but converge slightly toward one another so that they are not perfectly perpendicular to the longitudinal axis of the shin guard 42. As also shown in FIG. 3, the two ends 58 and 60 are respectively provided with identical locking projections 62 and 64, respectively which are located near the base 50 and project a short distance in the longitudinal direction from the surfaces 58,60. A rigid retaining loop 66 on the front edge 40a of shank 40 releasably receives the locking projection 62 of the shin guard 42, as illustrated in FIG. 3, while the opposite locking projection 64 is received and retained within an upwardly opening cavity 68 in the point 44. It will be noted that the shin guard 42 is symmetrical such that it may be installed with either end 58 or 60 up.

As shown in FIG. 3, the shank 40 has a foot piece 70 that serves as the receiving or mounting member for the point 44 and the cap 46. The foot piece 70 is generally rectangular in overall configuration and essentially comprises a fore-and-aft bar that is slightly thinner side-to-side than the shank 40 and is welded onto the bottom thereof in such manner that the opposite sides of the foot piece 70 are slightly inset or recessed relative to the side surfaces of the shank 40. As a consequence, there is a slight overhanging ledge 72 presented around the bottom of the shank 40 where it intersects with the narrower foot piece 70. The front end of the foot piece 70 is tapered vertically to present a gently pointed, blunt-ended toe 74 that projects forwardly beyond the front edge 40a of the shank for snug insertion into the point 44 as will be subsequently described. The rear end of the foot piece 70 terminates substantially flush with the rear edge 40b of the shank 40. The foot piece is preferably constructed from the same high carbon steel as the main portion of the shank 40.

The point 44 is received onto the toe 74 of the foot piece 70 in the manner illustrated in FIG. 3; however, details of construction of the point 44 are best seen viewing FIGS. 11-13 and 24. It will be seen that the point 44 comprises a unitary cast body, preferably constructed from abrasion-resistant cast iron as with the shin guard 42. The body of the point 44 is generally triangular when viewed in side elevation, as in FIG. 11, and includes a lowermost and forwardmost tip 76 toward which most portions of the point 44 converge. A front slicing edge 78 leads upwardly and rearwardly from the tip 76 in a slightly concave manner so as to merge with and form a continuation of the leading edge 56 of the shin guard 42 when the point 44 is in place on the shank 40. The point body is relatively slender, presenting a pair of opposite, mirror image side faces 80 and 82 which are generally upright and lead rearwardly from the tip 76 and the front edge 78, the side faces 80,82 diverging from the front edge 78 for only a relatively short distance before turning rearwardly and becoming entirely upright and flat. Consequently, the side faces 80,82 present a slender profile as the point 44 moves through the soil.

The point 44 also includes an underslung bottom wall 84 which spans the two side faces 80,82 and presents a generally flat bottom surface to the soil, except for a stepped portion 86 which is slightly recessed upwardly from the rest of the bottom surface presented by the wall 84. An internal socket 88 formed within the point 44 has generally the same configuration as the toe 74 of the foot piece 70 so as to matingly receive such structure when the point 44 is installed on the shank 40. As is apparent, the socket 88 is open in an upward and rearward direction so as to permit entry of the toe 74 into the socket 88.

As earlier described, the body of the point 44 is also provided with a generally upwardly and rearwardly extending cavity 68 that branches off the socket 88 and is disposed to lockingly receive the locking projection 64 of the shin guard 42. The body of the point 44 is also notched out along its upper portion to present a pair of opposite, fore-and-aft extending, upper, laterally spaced, horizontal locating edges 90 and 92 that butt up against the underside of the overhanging ledges 72 between the shank 40 and the foot piece 70 when the point 44 is installed on the shank 40. A pair of upwardly and rearwardly inclined locating edges 94 and 96 are disposed on the point body at the forward ends of the locating edges 90 and 92 for abutment against the front edge 40a of the shank 40 when the point 44 is installed. A topmost upwardly and outwardly angled flat surface 98 on the body of the point 44 is disposed at the same angle as the opposite ends 58 and 60 of the shin guard 42 such that topmost surface 98 butts snugly up against the lower end 60 of the shin guard 42 when the point 44 is installed.

The body of the point 44 is also provided with a pair of aligned transverse holes 100 through the two side faces 80,82 generally adjacent the rear of the point 44. The holes 100 line up with a corresponding transverse hole 102 (FIG. 3) in the foot piece 70 when the point 44 is snugly received on the toe 74 so that a transverse roll pin 104 (FIG. 3) may be driven through the aligned holes 100 and 102 to releasably lock the point 44 in place on the foot piece 70. The roll pin 104 is of such diameter that it may be driven tightly into the aligned holes 100,102 to retain the point 44 in place without additional retaining means, and may similarly be driven out of place when it is time to remove the point 44, all as well understood by those skilled in this art.

The point 44, as hereinabove discussed, also includes a pair of wing-like vanes 106 and 108 projecting outwardly from the opposite side faces 80,82. The two vanes 106,108 are generally triangular in overall plan configuration and are angled upwardly and rearwardly from the tip 76. The two outer edges 110 and 112 of the vanes 106,108, respectively, diverge in a gentle, streamlined manner from the tip 76 until the approximate fore-and-aft midpoint of the point 44 is reached, at which location the edges 110,112 extend in parallel relation to one another until the rearmost extremity of the point 44 is reached, as illustrated perhaps best in FIG. 12. It will be noted from FIG. 11, for example, that the vanes 106,108 generally bisect the angle defined between the front edge 78 and the bottom surface of the bottom wall 84 as the wings extend rearwardly from the tip 76. Furthermore, it will be seen that each of the vanes 106,108 has a top surface 114 which extends upwardly and rearwardly at a constant angle until the point at which the outer edges 110,112 become parallel to one another is reached, at which location the top surface 114 levels off slightly to extend the remainder of its distance at a shallower angle. Each of the vanes 106,108 is relatively thin, having a bottom surface 116 which is generally parallel to the top surface 114 throughout the fore-and-aft length of the vanes 106,108, although it will be seen that both of the vanes 106,108 taper slightly toward a reduced thickness as the tip 76 is approached.

Details of the cap 46 are perhaps shown best in FIGS. 3, 24, and 14–17. The cap 46, like the point 44, is a unitary cast body formed from a suitable abrasion-resistant cast iron. The lower body portion of the cap 46 is transversely U-shaped, presenting a pair of upright sidewalls 118 and 120 and an underslung bottom wall 122 which integrally interconnects the two sidewalls 118 and 120. As illustrated perhaps best in FIG. 3, the two sidewalls 118,120 of the U-shaped body portion of the cap 46 are dimensioned to embrace opposite sides of the foot piece 70 when the cap 46 is installed, while the bottom wall 122 is adapted to pass under and along the lower extremity of the foot piece 70 at that time. The sidewalls 118 and 120 are of such thickness as to fit generally flush under the overhanging ledges 72 when the cap 46 is installed. The front extremity of the U-shaped portion of the cap 46 is configured generally complimentarily to the rear extremity of the point 44 such that the two components effectively blend together and produce a generally flush side extremity below the ledges 72 when both the point 44 and the cap 46 are installed.

The cap 46 also includes a delta wing lifter broadly denoted by the numeral 124 and formed by a pair of wings 126 and 128 projecting laterally outwardly from opposite sidewalls 118 and 120 along their upper extremities. Although the two wings 126 and 128 are separated along their front portions where they are joined to the sidewalls 118 and 120 so as to form a central receiving slot 130 for the foot piece 70, they are interconnected at their rear extremity which overhangs the rear extent of the U-shaped portion of the cap 46. Each of the wings 126,128 is generally triangular shaped, having outermost edges 132 and 134 that diverge symmetrically from the two sidewalls 118 and 120 at the front of the cap 46 to a wide spread position back behind the slot 130. A rear edge 136 of the delta shape formed by the two wings 126,128 interconnects the two diverging outer edges 132 and 134.

Each of the wings 126 and 128 has a triangular upper surface 138 which slopes upwardly and rearwardly from the front of the cap 46, as well as sloping downwardly and outwardly toward the respective outer edge 132 or 134. Consequently, the upper surfaces 138 provide a significant profile in a fore-and-aft sense to the soil as the cap 46 moves therethrough, and also exert laterally outward and upward forces in the soil during such movement. Bottom surfaces 140 on the wings 126 and 128 slope slightly downwardly and inwardly from the outer edges 132,134 to also exert a degree of laterally outward pressure to the soil beneath the wings 132,134 as the cap 46 moves therethrough. A fore-and-aft ridge 142 is defined by the intersection of the two sloping upper surfaces 138 of the wings 126,128 immediately behind the slot 130.

The U-shaped portion of the cap 46 is provided with two sets of aligned mounting holes 144 and 146 for use in securing the cap 46 to the foot piece 70. Corresponding mounting holes 148 and 150 in the foot piece 70 become aligned with the holes 144,146 when the cap 46 is placed upon the foot piece 70, and transverse roll pins 152 and 154 (FIG. 3) are inserted into the aligned holes 144,148 and 146,150 to releasably retain the cap 46 on the shank 40.

In its preferred form, the cap 46 has each of the outer edges 132,134 of the wings 126,128 angling rearwardly from the central fore-and-aft axis of the cap 46 at an angle of approximately 11° from such centerline, as viewed in top plan in FIG. 15. The top surfaces 138 of the wings 126,128 slope upwardly and rearwardly at an angle of approximately 4° degrees from a horizontal plane defined by the outer edges 132,134, as viewed in side elevation in FIGS. 14 and 16. The top surfaces 138 also slope upwardly and inwardly at an angle of approximately 15° from the plane of the outer edges 132 and 134, as viewed in end elevation in FIG. 17.

In the preferred form of the point 44, the top surfaces 114 of the vanes 106 and 108 in the region where the outer edges 110 and 112 diverge are angled upwardly and rearwardly at an angle of approximately 16° from the plane of the stepped bottom portion 86 of the point body 44, as viewed in side elevation in FIG. 11. In the region where the outer edges 110 and 112 are parallel to one another is reached, the top vane surfaces 114 slope upwardly and rearwardly at only approximately 6° from the plane of the stepped bottom portion 86, as viewed in side elevation in FIG. 11. Preferably, in the area where the outer edges 110 and 112 are diverging, such edges 110,112 are disposed at angles slightly less than 11° from the fore-and-aft longitudinal centerline through the point 44, as viewed in top plan in FIG. 12.

In their preferred forms, the shin guard 42, point 44, and cap 46 are constructed from an abrasion-resistant cast iron which falls within ASTM specification A532, Class II, Type E. A preferred composition of the abrasion-resistent cast iron includes: Chrome 19.0–21.0%; Carbon 3.10–3.30%; Silicon 0.60–0.70%; Manganese 0.650–80%; Molybdenum 0.95–1.15%; Sulfur less than 0.03%; Phosphorus less than 0.05%. Castings made in accordance with the foregoing composition are cooled in the mold until reaching 200° F. or less.

In accordance with further principles of the present invention, the point 44 and the cap 46 may be removably interchanged with points and caps having shapes which differ in some respects from the point 44 and the cap 46 so that the farmer can select the particular subsoiling action which is best for his particular situation and field conditions. For example, instead of the point 44, the shank 40 may be fitted with the point 244 of FIGS. 8, 9, and 10, which is identical in all respects to the point 44, except that the point 244 has no vanes 106 and 108. Instead of the cap 46, the shank 40 may be fitted with the cap 246 of FIGS. 18–21, which is identical in all respects to the cap 46, except that the upper wing surfaces on the cap 246 are more steeply inclined both fore-and-aft and side-to-side than in the cap 46. In this respect, the fore-and-aft slope angle on the upper surfaces of the wings in the cap 246 is on the order of 15° to 16° instead of 5° to 6°, as in the cap 46, while the slope angle side-to-side in the cap 246 is on the order of 35° instead of 15° as in the cap 46. Consequently, the cap 246 has a significantly greater soil fracturing force which it exerts both upwardly and laterally outwardly than the cap 46 as the units move through the soil.

FIGS. 4–7 show a third form of cap which provides hardened protection for the foot piece 70 of the shank 40, but does not exert any upward or laterally outward fracturing forces. It will be seen in this respect that the cap 346 of FIGS. 4–7 is identical to the caps 46 and 246, except that the cap 346 has no wings at all. The cap 346 is identical to the U-shape portions of the caps 46 and 246 without any laterally outwardly projecting wings at the upper extremities of its upright sidewalls.

As a consequence of the interchangeability of the points 44,244 and the caps 46,246,346, the shanks 40 may be provided with a variable combination of these components to arrive at the profile which best suits the farmer's immediate needs. For example, the arrangement in FIG. 24 with the vane point 44 and the moderately winged cap 46 has been described above. In addition, the shank 40 may be fitted out as illustrated in FIG. 22 in which the vaneless point 244 is utilized with the wingless cap 346 to present a very narrow profile which in practice has been as small as 1-½ inches wide. When the point 244 and cap 346 are this narrow, they are no wider than the structure used to carry them to the point of subsoil interaction, i.e., the narrow shank 40. This combination provides the least amount of subsoiling action and may be especially well suited for inter-row ripping where it is desirable to cultivate between the rows of standing crops, but leave the soil under the plants themselves undisturbed. The slender, knife-like profile of the subsoiler presented by the FIG. 22 configuration assures only minimal side lifting.

This narrow profile configuration has been found to be helpful in the deep tilling of established, deep-root crops such as alfalfa. On-going crops such as alfalfa progressively decrease their ability to uptake water each successive season such that the yields are eventually diminished to the point that the fields have to be planted in other crops. While other deep tilling rippers may fracture and destroy the root zone of such deep root crops, it has been found that a ripper employing the narrow profile configuration of the present invention does not have such deleterious effect. Consequently, a deep air/water exchange point can be created for the crops without damaging their fragile root system.

FIG. 23 shows a slightly more aggressive subsoiling profile than that presented by FIG. 22. In FIG. 23, the vane point 44 is used in combination with the wingless cap 346. The narrow vanes 106 and 108 add a small amount of vertical lifting to the soil and also have a certain amount of laterally outwardly directed lifting action, notwithstanding their lack of outwardly inclined surfaces.

FIG. 25 shows the subsoiler set up with the vaneless point 244 and the moderately winged cap 46. With this arrangement, the point 244 merely performs a slicing action as it moves through the subsoil, but the wings 126 and 128 provide significant vertical lifting, as well as laterally outwardly directed fracturing action.

Figure 26:
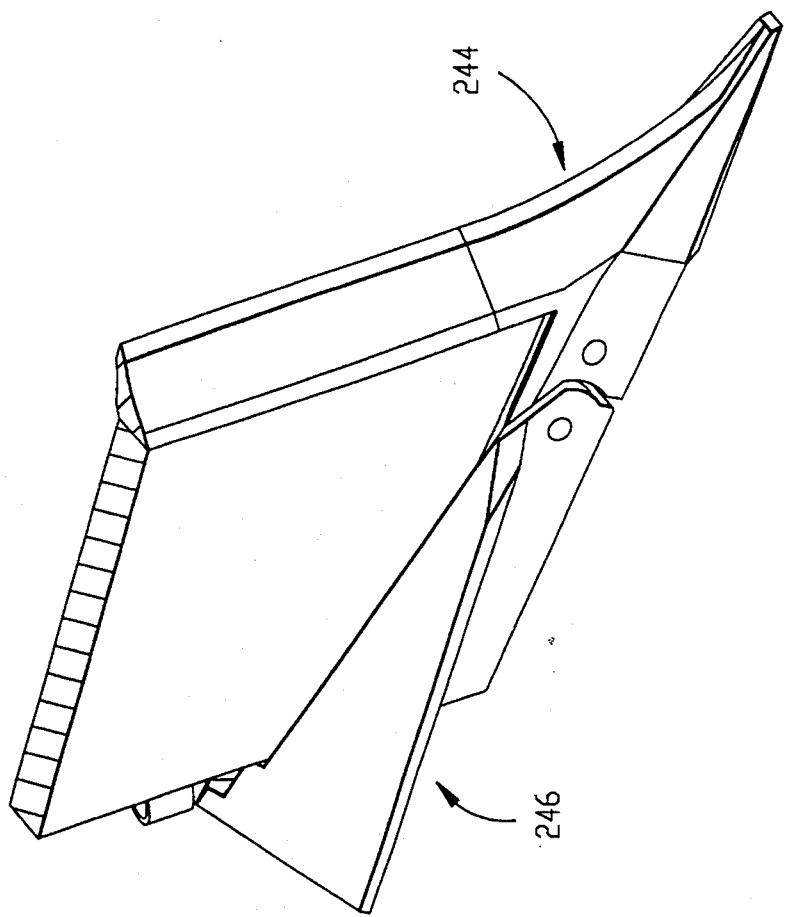
FIG. 26 is a right front perspective view of the shank set up for maximum tillage action utilizing the vaned point of FIGS. 11-13 in combination with the most steeply inclined wing cap of FIGS. 18-21.

The setup in FIG. 26 is the most aggressive subsoiling profile available with the components of the present invention. This Figure shows the shank 40 provided with both the vane point 44 and the aggressively winged cap 246 with its high sloping wings. Accordingly, although the fracturing action by the point 44 is the same as that in FIGS. 23 and 24, there is significantly greater fracturing action behind the point 44 than in the FIG. 23 and FIG. 24 arrangements.

Figure 27:
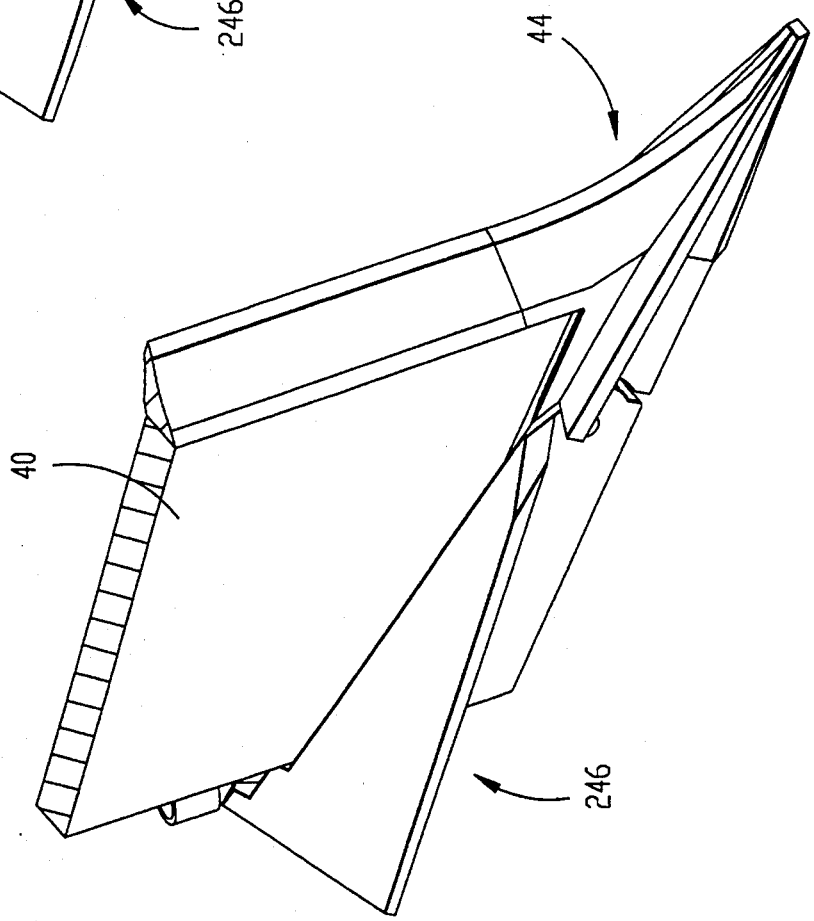
FIG. 27 is a right front perspective view of the shank showing a similar setup to the FIG. 26 arrangement, except that the shank utilizes the vaneless point of FIGS. 8-10 in combination with the most steeply inclined Wing cap of FIGS. 18-21.

FIG. 27 shows the use of the steep winged cap 246 with the vaneless point 244. Hence, as in some of the earlier configurations, the point 244 merely slices through the soil without any significant lifting, while the steeply inclined winged cap 246 creates substantial lateral and vertical lifting action.

Operation

FIGS. 28 and 29 have been prepared to illustrate the action of the subsoiler of the present invention as it moves through the soil. The particular subsoiler profile illustrated in FIG. 29 has a vaned point 44 in combination with the moderately winged cap 46, both of which are utilized in combination with the shin guard 42 which is common to all combinations of points and caps.

Referring jointly to FIGS. 28 and 29, it will be seen that as the subsoiler moves forward at the depth determined by the gauge wheels 24,26, the leading edge presented by the shin guard 42 and the point 44 cuts and slices cleanly through the soil and causes it to part gently to produce a slit. The slender configuration of the shin guard 42, the point 44, and the cap 46 as well as the thinness of the shank 40 itself, contribute to the smooth movement of the subsoiler through the soil without a bulldozing and upheaving action which would create heavy clodding and slabbing of the surface soil. The purpose of the shank 40 is merely to provide a means of placing the cultivating components, i.e., the point 44 and the cap 46, down at the level of the hardpan in the soil represented by the soil layer 156 in FIG. 29. The desire is to open the slit itself to the minimum extent possible using the shin guard 42 and the shank 40 while allowing the tillage components 44 and 46 to do their work of loosening and displacing the soil below the ground surface such that there is only a minimum amount of disturbance of crop residue and other materials on top of the ground.

Thus, it will be seen that the soil fracturing action provided by the subsoiler of the present invention is behind the leading edge of the shank line or cut being taken in the soil by the shin guard 42 and the point 44. Such fracturing action is believed to result from a three-dimensional, conically shaped shock wave pattern having its apex at the tip of the point 44 and flaring symmetrically outwardly and rearwardly therefrom at an included angle of approximately 30° in all directions. The effect of the three-dimensional, conical shock wave on the soil is seen in side elevation in FIG. 29 in which it will be noted that the soil layers above the point 44 and cap 46 are gently lifted upwardly and rearwardly to fracture the same without destroying their natural layered characteristics. Furthermore, no new hardpan is created as the soil beneath the point 44 and the cap 46 is subjected to the downwardly flaring shock wave pattern.

As illustrated by the top plan view of FIG. 28, the conical shock wave of each shank assembly 36, represented by the numeral 158, is produced gradually and in a rearward-flowing, controlled manner, not abruptly with a massive frontal force that would produced turbulent and unpredictable shock patterns in the soil ahead of the assemblies 36. It is only at a point far behind the leading edge of the shank assemblies 36 that the cone patterns apparently intersect to produce a somewhat more turbulent effect. By varying the speed of advancement of the shank assemblies 36 through the soil, the cone patterns 158 may be varied, the widest cone pattern 158 in FIG. 28 corresponding to a typical ground speed in the neighborhod of approximately 6 miles per hour. The angled flare lines disposed inwardly of the cones 158 in FIG. 28 representing conical shock patterns at somewhat slower speeds.

The cone effect is derived from what may be termed laminar flow of the soil in a controlled and relatively streamlined manner up and over the inclined surfaces of the vanes 106,108 on the point 44 and the wings 126,128 on the cap 46. With the soil flowing around the shank 40 in a relatively streamlined manner and primarily up and over the wing surfaces in a laminar flow condition, the fracturing action can be controlled much better than would otherwise be the case and power requirements can even be reduced. Interchanging the various points and caps maintains the laminar flow concepts of the present invention, yet permits the farmer to have greater control over cross-row fracturing and lifting without destroying the natural layering of the soil.

Minimizing disruption of the soil surface, particularly that in front of the shank 40, also seems to have an effect in reducing the accumulation of trash materials on the implement 10 as it moves through the soil. Whereas, an abrupt turbulent action on some devices seems to cause the residue to boil up and catch on supporting shanks and the framework of the machine, in the present invention the residue seems to part more readily and simply flow along opposite sides of the shank instead of being caught up in the upright structures presented by the multiple shanks of the implement. As earlier mentioned, however, the use of a cutting coulter in front of the shank assemblies 36 may be desirable in some field conditions.

Adjustable Wing Embodiment

FIGS. 30-35 disclose an alternate embodiment of the invention in which the profile of the subsoiling components of the machine can be angularly adjusted while they remain in place on the machine. As illustrated in FIG. 30, such a machine has been designated by the numeral 400 and includes a wheeled, flat, transverse frame 402 that is similar in general respects to the frame of the subsoiler 10 illustrated in FIG. 1. Shank assemblies 404 are mounted on the frame 402 at spaced intervals across the same. As illustrated in the exploded view of FIG. 31, each of the shank assemblies 404 broadly includes a shank 406, a foot piece 408, a shin guard 410, a point 412, and a cap 414.

The shin guard 410 is substantially identical to the shin guard 42 in the earlier embodiments, although the locking projections at opposite ends of the shin guard 410 do not appear in FIG. 31. The point 412 most nearly resembles the vaneless point 244 of FIGS. 8-10, being devoid of wings or vanes so as to generally minimize the soil fracturing action as the point 412 moves through the soil. However, the point 412 does have a pair of upwardly and inwardly inclined surfaces 416 (only one of such surfaces being illustrated) which converge to a sharp front edge 418 that leads upwardly and rearwardly from a lowermost tip 420. Thus, to some extent, the lateral sloping of the surfaces 416 provides a degree of laterally outwardly directed lifting forces, although these are not intended to be particularly significant. Opposite side faces 422 on the point 412 (only of one of such side faces being illustrated) extend in a generally upright plane and intersect at their lower extremities with the bottom wall 424 of the point 412.

The point 412 is hollow to the extent illustrated with respect to the earlier points so as to define an internal receiving socket (not shown) for the toe 426 on the foot piece 408. Holes 428 in the side faces 422 of the point 412 may be aligned with a corresponding transverse hole 430 in the foot piece 408 when the toe 426 is inserted into the point 412 so that the point 412 may be detachably held in place by a removable roll pin 432 as shown in FIGS. 33-35.

The cap 414 is a unitary cast component having a pair of opposite, fore-and-aft extending side bars 434, as illustrated in FIG. 32. The side bars 434 are spaced apart in a lateral direction according to the thickness of the foot piece 408 so as to be disposed on opposite sides of the latter when the cap 414 is installed. A delta wing lifter 436 is integrally formed with the side bars 434 along their top and rear margins to rigidly interconnect the side bars 434 at those locations while presenting a centrally disposed clearance slot 438 (FIG. 32) for the shank 406 when the cap 414 is installed.

The delta wing lifter 436 is defined by a pair of side wings 440 and 442 along the upper stretches of the side bars 434 which are spaced apart along the front and central lengths thereof but are interconnected across their rear ends to form a unitary, delta-shaped structure. Laterally outer edges 444 and 446 of the wings 440 and 442, respectively, diverge from the front ends of the side bars 434 until the rear of the delta lifter 436 is reached. A flat transverse wall 448 of triangular configuration spans the outer edges 444 and 446 across the rear of the lifter 436 and is presented with its triangular configuration due to the upward and inward side slope given to the top surfaces 450 and 452 of the wings 440 and 442. The surfaces 450 and 452 intersect one another at the rear of the lifter 436 in a central fore-and-aft ridge 454. The bottom surfaces 456 and 458 of the wings 440 and 442, respectively, are flat and extend parallel to the lower extremity of the side bars 434.

The two side bars 434 are provided with a pair of aligned holes 460 which are aligned with a front hole 462 in the foot piece 408 when the cap 414 is installed. Thus, the aligned holes 460 and 462 may receive a removable roll pin 464 as illustrated in FIGS. 33-35. The roll pin 464 not only removably retains the cap 414 on the foot piece 408, but also serves as a point of pivotal adjustment action for raising or lowering the cap 414 into any selected one of the three variable profile positions in FIGS. 33, 34, and 35. It will be seen in this respect that there are three adjustment holes 466, 468, and 470 in the side bars 434 which may be selectively aligned with corresponding adjustment holes 472,474, and 476 in the foot piece 408. Thus, as shown in FIG. 33, when the cap 414 is in its lowermost adjusted position, the holes 466 and 472 are aligned so as to permit removable reception of a roll pin 478. In this lowered position, the cap 414 is set for the minimum amount of lifting that is possible with the cap 414.

On the other hand, when the cap 414 is adjusted upwardly from the FIG. 33 position to align the holes 468 with the hole 474 in foot piece 408, the roll pin 478 may be inserted into those particular aligned holes so as to retain the cap 414 in the intermediate position of FIG. 34. In this position the cap 414 has increased lifting action compared to that of FIG. 33, although less than that available in FIG. 35, as will be seen.

In the event the cap 414 is adjusted to its most aggressive profile condition, as illustrated in FIG. 35, the holes 470 of the side bars 434 are aligned with the hole 476 in the foot piece 408, permitting the roll pin 478 to be inserted into those particular aligned holes and retain the cap 414 in this position. This is the most aggressive position for soil lifting of the three illustrated positions, although in all of such adjusted positions the fracturing action occurs behind the leading edge of the opening slice presented by the shank assembly 404 so as to produce laminar flow that is readily controllable and which minimizes disturbance of residue on top of the ground.

Preferably, the shin guard 410, the point 412, and the cap 414 are all constructed from a suitable abrasion resistant cast iron such as that utilized in connection with earlier described embodiments of the invention.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of his invention as pertains to any apparatus not materially departing from but outside the literal scope of the invention as set out in the following claims.

I claim:

1. In an agricultural subsoiler, the improvement comprising:
   an upright shank having a leading edge adapted to open a vertical slit in the soil as the subsoiler is advanced; and
   a downwardly and forwardly inclined delta wing lifter adjacent a lower end of the shank behind said leading edge for fracturing soil above the lifter as the shank moves through the soil,
   said lifter being generally triangular in top plank presenting a pair of opposite outer edges which diverge symmetrically rearwardly outwardly from opposite sides of the shank to a location behind a trailing edge of the shank, and a transverse rear extremity which spans the shank behind said trailing edge to interconnect said outer edges,
   said lifter-having a pitched top extremity presenting a pair of upwardly facing top surfaces sloping downwardly and laterally outwardly in opposite directions from said opposite sides of the shank to said diverging outer edges,
   said top surfaces intersecting in a central, fore-and-aft ridge behind the shank.

2. In an agricultural subsoiler as claimed in claim 1,
   said lifter being in the form of a unitary body removably secured to the shank.

3. In an agricultural subsoiler as claimed in claim 2; and
   a unitary point body removably secured to the shank in front of the lifter body.

4. In an agricultural subsoiler, the improvement comprising:
   an upright shank having a leading edge adapted to open a vertical slit in the soil as the subsoiler is advanced; and
   a downwardly and forwardly inclined delta wing lifter adjacent a lower end of the shank behind said leading edge for fracturing soil above the lifter as the shank moves through the soil,
   said lifter being generally triangular in top plan, presenting a pair of opposite outer edges which diverge symmetrically rearwardly outwardly from opposite sides of the shank to a location behind a trailing edge of the shank, and a transverse rear extremity which spans the shank behind said trailing edge to interconnect said outer edges,
   said lifter being in the form of a unitary body removably secured to the shank,
   said body including a lowermost, central, fore-and-aft extending, generally transversely U-shaped cap adapted to fit onto and matingly receive the lower end of the shank,
   said cap presenting a pair of opposite upright sidewalls which embrace opposite sides of the shank,
   said body further including a pair of triangular wings projecting laterally outwardly from opposite sidewalls of the cap adjacent an upper extremity of the latter,
   said wings being mutually spaced apart adjacent a front end of the body but joined together adjacent a rear end thereof to present said generally triangular in top plan configuration of the lifter.

5. In an agricultural subsoiler as claimed in claim 4,
   said shank and said sidewalls of the cap having transverse pin means interconnecting the same to removably secure the body on the shank.

6. In an agricultural subsoiler as claimed in claim 4,
   said wings presenting a pair of upwardly facing surfaces sloping downwardly and laterally outwardly in opposite directions from said opposite sides of the shank to said diverging outer edges.

7. In an agricultural subsoiler as claimed in claim 6,
   said top surfaces intersecting in a central, fore-and-aft ridge behind the shank.

8. In an agricultural subsoiler, the improvement comprising:
   an upright shank having a leading edge adapted to open a vertical slit in the soil as the subsoiler is advanced;
   a downwardly and forwardly inclined delta wing lifter adjacent a lower end of the shank behind said leading edge for fracturing soil above the lifter as the shank moves through the soil,
   said lifter being, generally triangular in top plan, presenting a pair of opposite outer edges which diverge symmetrically rearwardly outwardly from opposite sides of the shank to a location behind a trailing edge of the shank, and a transverse rear extremity which spans the shank behind said trailing edge to interconnect said outer edges; and
   a soil penetrating point at the intersection of said leading edge of the shank and the lower end of the shank,
   said point having a pair of point wings projecting laterally outwardly from opposite sides thereof ahead of the delta wing lifter,
   said point having a lowermost and forwardmost tip at an elevation lower than the delta wing lifter,
   said point wings diverging upwardly and rearwardly from said tip until reaching at least the approximate level of the delta wing lifter, whereupon the point wings extend rearwardly at a generally constant width and at generally the same level as the delta wing lifter.

9. In an agricultural subsoiler as claimed in claim 8,
   said point being in the form of a unitary body removably secured to the shank.

10. In an agricultural subsoiler as claimed in claim 9,
   said point body having said lowermost and forwardmost tip formed as an integral part thereof, a front edge extending upwardly and rearwardly from the tip, a pair of opposite, generally upright side faces leading rearwardly from said tip and said front edge, and said point wings projecting outwardly from said side faces, said point body having an internal socket and being open along a rear portion thereof to expose the socket for mating reception of the lower forward end of the shank.

11. In an agricultural subsoiler as claimed in claim 10, said shank and the side faces of the point body having transverse pin means removably securing the point body on the shank.

12. In an agricultural subsoiler as claimed in claim 11, said point body having a lowermost and forwardmost tip, a front edge extending upwardly and rearwardly from the tip, and a pair of opposite, generally upright side faces leading rearwardly from said tip and said front edge, said point body having an internal socket and being open along a rear portion thereof to expose the socket for mating reception of the lower forward end of the shank.

13. In an agricultural subsoiler as claimed in claim 12; and a pair of wings projecting outwardly from opposite side faces of the point body.

14. In an agricultural subsoiler as claimed in claim 13, said point wings diverging upwardly and rearwardly from said tip until reaching at least the approximate level of the delta wing lifter, whereupon the point wings extend rearwardly at a generally constant width and at generally the same level as the delta wing lifter.

15. In an agricultural subsoiler as claimed in claim 12, said lifter body including a lowermost, central, fore-and-aft extending, generally transversely U-shaped cap adapted to fit onto and matingly receive the lower end of the shank, said cap presenting a pair of opposite upright sidewalls which embrace opposite sides of the shank, said lifter body further including a pair of triangular wings projecting laterally outwardly from opposite sidewalls of the cap adjacent an upper extremity of the latter, said wings being mutually spaced apart adjacent a front end of the body but joined together adjacent a rear end thereof to present said generally triangular, in top plan, configuration of the lifter.

16. In an agricultural subsoiler, the improvement comprising:

a generally upright shank having a leading edge and a lower end provided with a fore-and-aft extending foot piece having a forwardly protecting toe;.

a plurality of selectively interchangeable points adapted for detachable mounting on said foot piece, each of said points including a unitary point body having a lowermost and forwardmost tip, a front edge leading generally upwardly and rearwardly away from the tip, a pair of generally upright side faces leading rearwardly from said tip and said front edge, an internal, rearwardly opening socket configured to matingly receive said toe of the foot piece, and transverse pin means for detachably securing the selected point body to the foot piece, at least one of said interchangeable points having a pair of vanes projecting outwardly from opposite side faces of its body, at least one other of said interchangeable points being devoid of vanes on the opposite side faces of its body; and a plurality of selectively interchangeable caps adapted for detachable mounting on said foot piece behind the selected point, each of said caps including a unitary body and transverse pin means for detachably securing the selected cap to the foot piece, at least one of said caps including a pair of laterally outwardly projecting upwardly and rearwardly inclined, soil-lifting wings disposed to project laterally outwardly from opposite sides of the shank for fracturing soil behind said leading edge of the shank when the one cap is the selected cap on the shank, at least one other of said caps being devoid of said wings for minimizing fracturing of soil behind said leading edge of the shank when said other cap is the selected cap on the shank, each of said cap bodies being generally transversely U-shaped with a pair of opposite, upright sidewalls which are adapted to embrace said foot piece of the shank, said one cap having said lifting wings projecting outwardly from the opposite sidewalls while said other cap has its upright sidewalls devoid of said wings, said wings on the one cap being mutually spaced apart along a frontal portion of their length to define an upwardly facing clearance slot for the shank and being joined together at a rear portion of their length behind the shank, said wings on the one cap having outwardly and rearwardly diverging outer edges and a common transverse rear edge to yield an overall generally delta-shaped, in top plan, configuration to the two wings.

17. In an agricultural subsoiler as claimed in claim 16, said vanes on said one point terminating rearwardly at a level that corresponds generally with the level of said wings on said one cap.

18. In an agricultural subsoiler as claimed in claim 16, each of said wings on the one cap having a top surface which slopes laterally downwardly as its outer edge is approached and rearwardly upwardly as said rear edge is approached, said wings having a common fore-and-aft extending ridge behind the slot.

19. A replaceable point adapted for removable attachment to the forwardly projecting toe on the foot piece of a generally upright subsoiler shank, said point comprising:

a one-piece unitary body that is generally triangular in side elevation presenting a normally lowermost and forwardmost tip, a front edge leading upwardly and rearwardly from the tip, a pair of opposite generally upright side faces leading rearwardly from the tip and said front edge, and an underslung bottom wall interconnecting said side faces, said body having an internal socket which is rearwardly open to expose the socket for mating reception of the toe of the foot piece, said side faces of the body having a pair of aligned holes for reception of a transverse mounting pin when the point is attached to the shank, said side faces having a pair of soil-directing vanes projecting laterally outwardly therefrom, said vanes originating at said tip and sloping upwardly and rearwardly as the tip is departed, said vanes having outer edges which diverge outwardly and rearwardly as the tip is departed until reaching a predetermined level, whereupon said outer edges extend generally parallel to one another.

20. A replaceable point as claimed in claim 19, said vanes extending rearwardly at a shallower angle behind said predetermined level than in front of said predetermined level.

21. A replaceable point as claimed in claim 20, each of said vanes being relatively thin, with portions of the side faces of the body extending above and below the vanes.

22. A replaceable cap adapted for removable attachment to the fore-and-aft foot piece of a subsoiler shank, said cap comprising:

a one-piece unitary body having a generally transversely U-shaped portion presenting a pair of opposite generally upright sidewalls that embrace opposite sides of the foot piece and an underslung bottom wall that interconnects the sidewalls below the foot piece, said sidewalls having aligned holes for reception of transverse mounting pin means when the cap is attached to the foot piece; and a pair of generally triangular wings projecting laterally outwardly from opposite sidewalls of the cap adjacent an upper extremity of the latter, said wings having respective outer edges which diverge symmetrically rearwardly and outwardly from the U-shaped portion of the body, said wings presenting a pair of upwardly facing surfaces sloping downwardly and laterally outwardly in opposite directions from said sidewalls of the body to said diverging outer edges, said wings being mutually spaced apart adjacent a front end of the body but joined together adjacent a rear end thereof to present an overall generally delta configuration when viewed in top plan.

23. A replaceable cap as claimed in claim 22, said wings having a fore-and-aft ridge therebetween at the point of intersection of their upwardly facing surfaces adjacent said rear end of the body.

24. A replaceable cap as claimed in claim 23, each of said wings having downwardly facing lower surfaces sloping slightly downwardly and inwardly from said outer edges of the wings toward said U-shaped portion of the body.

* * * * *